United States Patent
Matsuo et al.

(10) Patent No.: US 9,106,330 B2
(45) Date of Patent: Aug. 11, 2015

(54) WIRELESS COMMUNICATION APPARATUS AND INTERFERENCE AVOIDANCE METHOD

(75) Inventors: Ryoko Matsuo, Tokyo (JP); Tomoko Adachi, Kawasaki (JP); Tomoya Tandai, Tokyo (JP); Takeshi Tomizawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 200 days.

(21) Appl. No.: 13/409,642

(22) Filed: Mar. 1, 2012

(65) Prior Publication Data

US 2013/0051318 A1 Feb. 28, 2013

(30) Foreign Application Priority Data

Aug. 25, 2011 (JP) .................................. 2011-184123

(51) Int. Cl.
 *H04W 36/06* (2009.01)
 *H04B 15/02* (2006.01)
 *H04L 1/20* (2006.01)

(52) U.S. Cl.
 CPC ................ *H04B 15/02* (2013.01); *H04L 1/203* (2013.01)

(58) Field of Classification Search
 CPC ... H04W 72/02; H04W 84/18; H04W 72/085; H04W 72/0406; H04B 15/02; H04L 1/203
 USPC .......................... 370/329–337, 437, 445–448
 See application file for complete search history.

(56) References Cited

U.S. PATENT DOCUMENTS

| | | | | |
|---|---|---|---|---|
| 2002/0080739 | A1* | 6/2002 | Kuwahara | 370/333 |
| 2007/0115847 | A1* | 5/2007 | Strutt et al. | 370/252 |
| 2007/0291792 | A1 | 12/2007 | Watfa et al. | |
| 2008/0095089 | A1* | 4/2008 | Nishiyama et al. | 370/311 |
| 2009/0180414 | A1 | 7/2009 | Maeda et al. | |
| 2009/0190608 | A1 | 7/2009 | Kawamoto | |
| 2009/0296591 | A1 | 12/2009 | Urabe et al. | |
| 2010/0027493 | A1 | 2/2010 | Dinulescu et al. | |

(Continued)

FOREIGN PATENT DOCUMENTS

| | | |
|---|---|---|
| CN | 101238744 A | 8/2008 |
| JP | 08-070292 A | 3/1996 |
| JP | 2006-094394 A | 4/2006 |
| JP | 2006-333358 A | 12/2006 |
| JP | 2008-79045 A | 4/2008 |
| JP | 2008-306665 A | 12/2008 |
| JP | 2009-182444 A | 8/2009 |

OTHER PUBLICATIONS

U.S. Appl. No. 13/411,197, filed Mar. 2, 2012, Title: "Communication System", First Named Inventor: Takeshi Tomizawa.

(Continued)

*Primary Examiner* — Khaled Kassim
*Assistant Examiner* — Zhaohui Yang
(74) *Attorney, Agent, or Firm* — Holtz, Holtz, Goodman & Chick PC

(57) ABSTRACT

A wireless communication apparatus in a first wireless system is provided with first, second and third units, and a controller. The first unit transmits frames over a frequency channel using a short or long IFS as compared with a specific one used in a second wireless system with a communication range wider than the first wireless system. The second unit receives frames over the channel. The third unit determines an error characteristic in the received frames and/or a busy status of the channel. The controller controls at least either one of whether to change the frequency channel or not, and whether to change a duration of an interframe space or not.

17 Claims, 10 Drawing Sheets

(56) References Cited

U.S. PATENT DOCUMENTS

2010/0029325 A1* 2/2010 Wang et al. ............... 455/553.1
2010/0142465 A1* 6/2010 Medepalli et al. ........... 370/329
2010/0189056 A1* 7/2010 Nishibayashi et al. ....... 370/329
2011/0044169 A1* 2/2011 Liu .............................. 370/235
2011/0200138 A1* 8/2011 Ode et al. .................... 375/295
2011/0205080 A1 8/2011 Millot et al.
2012/0163226 A1 6/2012 Tomizawa et al.

OTHER PUBLICATIONS

Chinese Office Action dated May 6, 2014 in counterpart Chinese Application No. 201210048227.4.

* cited by examiner

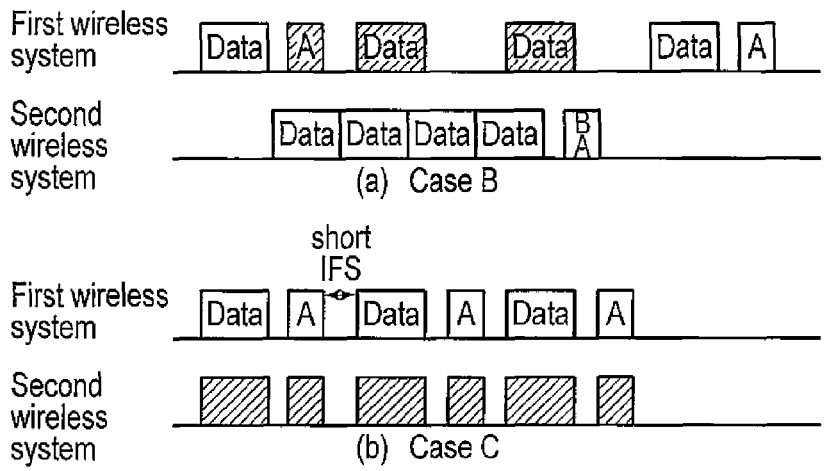
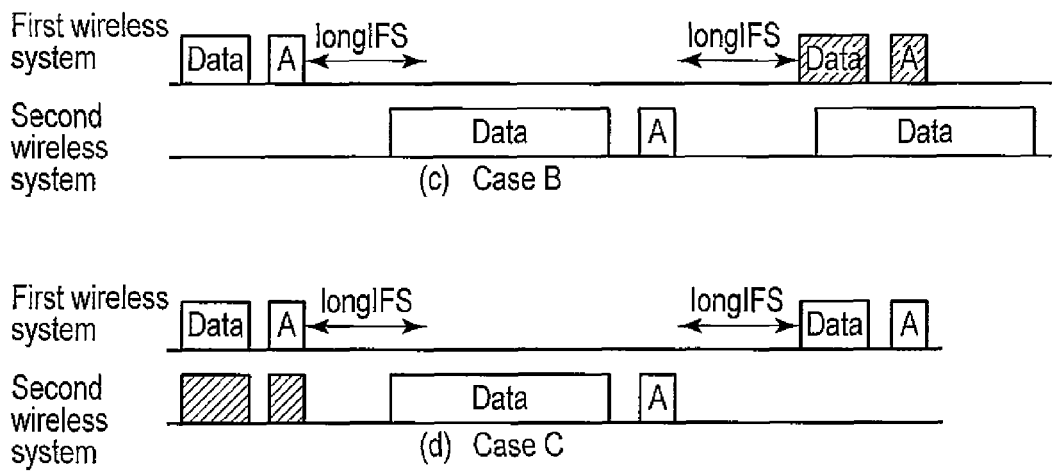
FIG. 5

|  | Case A | Case B | Case C |
|---|---|---|---|
| Frequency of occurrence of burst errors in IFS transmission | Low | High | Low |
| Processing for coexistence | IFS adjustment | Channel switching | IFS adjustment |
| Behavior after processing | There is no difficulty in frame transmission/ reception even after setting IFS long in IFS adjustment (there is no change) return IFS to short IFS again | | After setting IFS long in IFS adjustment, frame transmission/ reception becomes difficult (channel busy detection rate increase) |

F I G. 6

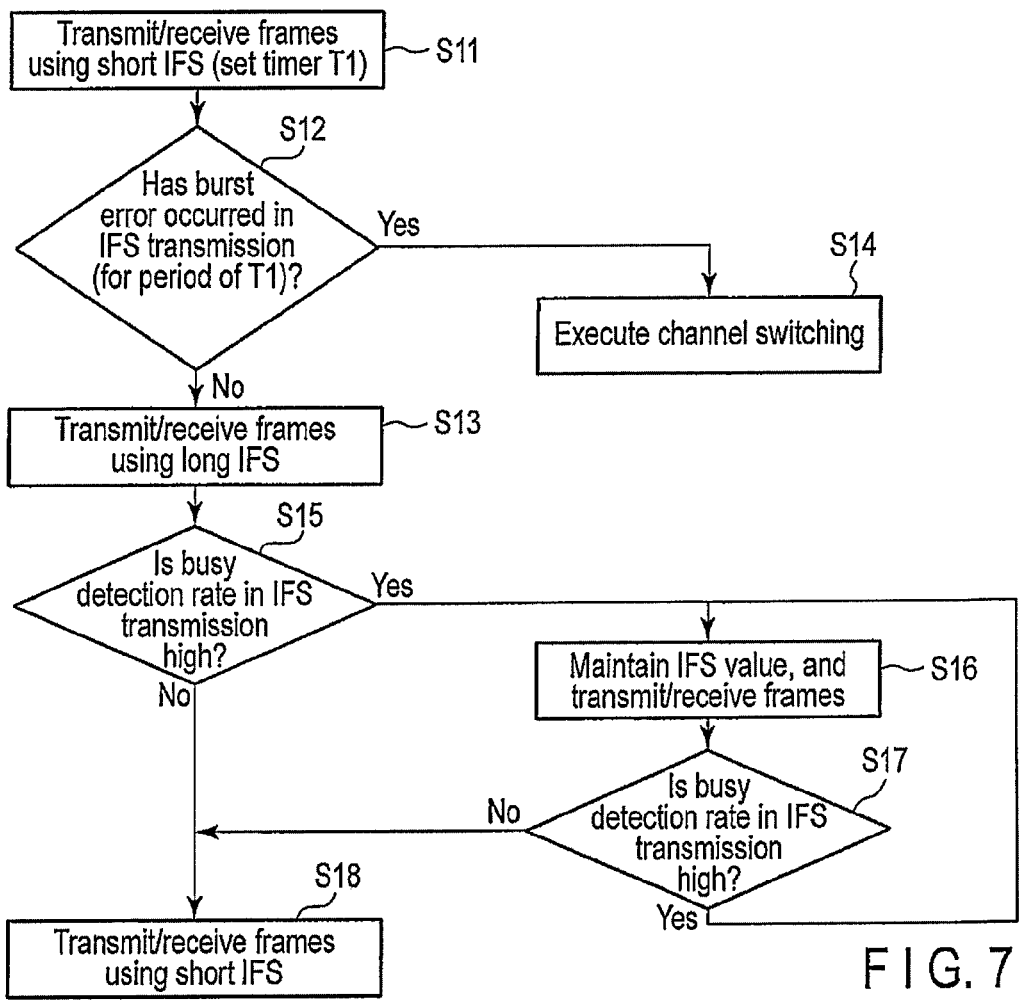

F I G. 7

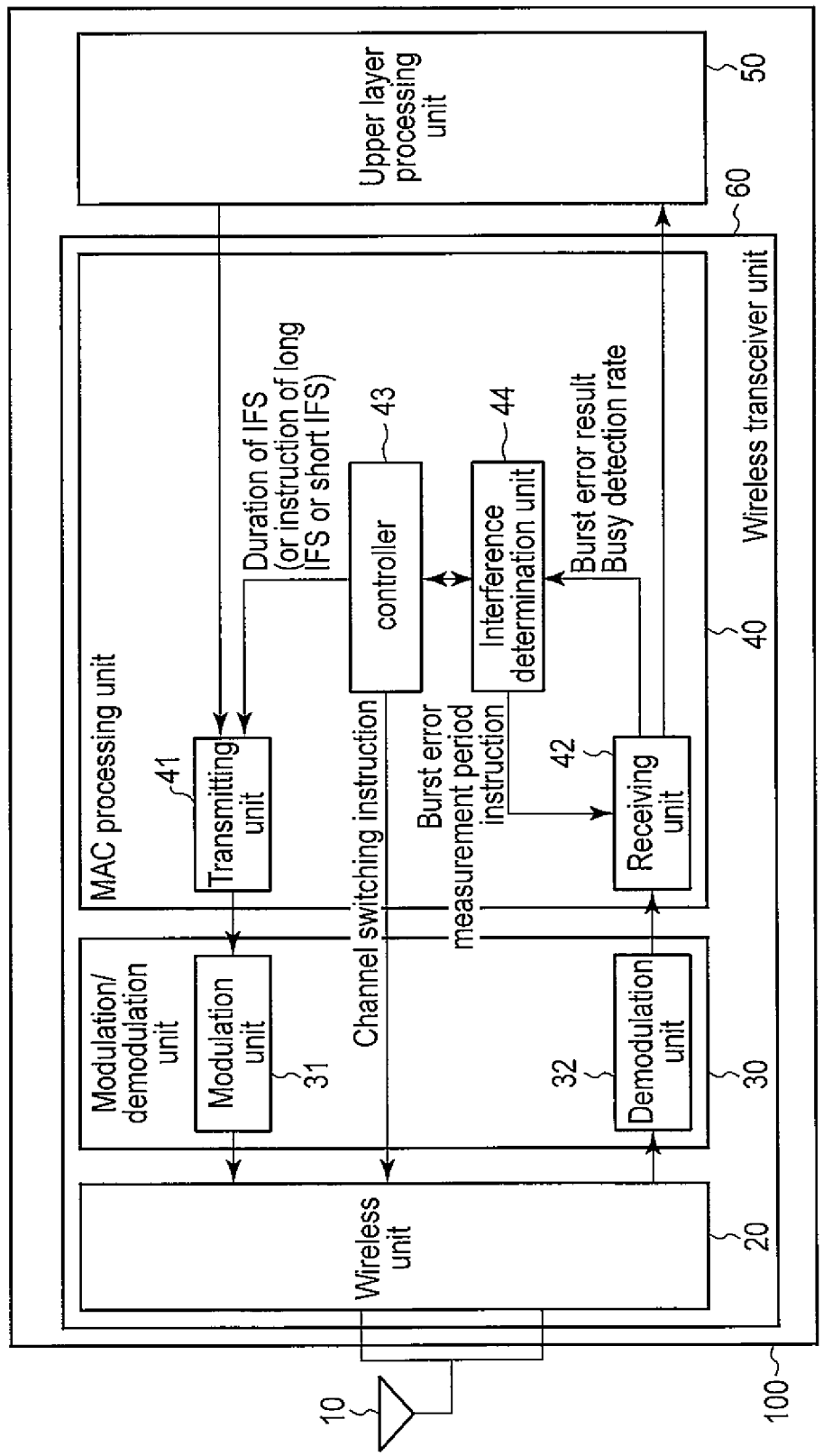
F I G. 8

|  | Case A | Case B | Case C |
|---|---|---|---|
| Busy detection rate (occupancy ratio) at start of IFS transmission or in connection processing | Low | High | High |
| Frequency of occurrence of burst errors in IFS transmission | Low | High | Low |
| Processing for coexistence | There is no change and maintain current status | Channel switching | IFS adjustment |

FIG. 9

|  | Case A | Case B | Case C |
|---|---|---|---|
| Busy detection rate (occupancy ratio) at start of IFS transmission or in connection processing | Low | High | High |
| Frequency of occurrence of burst errors in IFS transmission | Low | High | Low |
| Processing for coexistence | Execute IFS adjustment, and use short IFS | Channel switching | There is no change and maintain current status |

FIG. 11

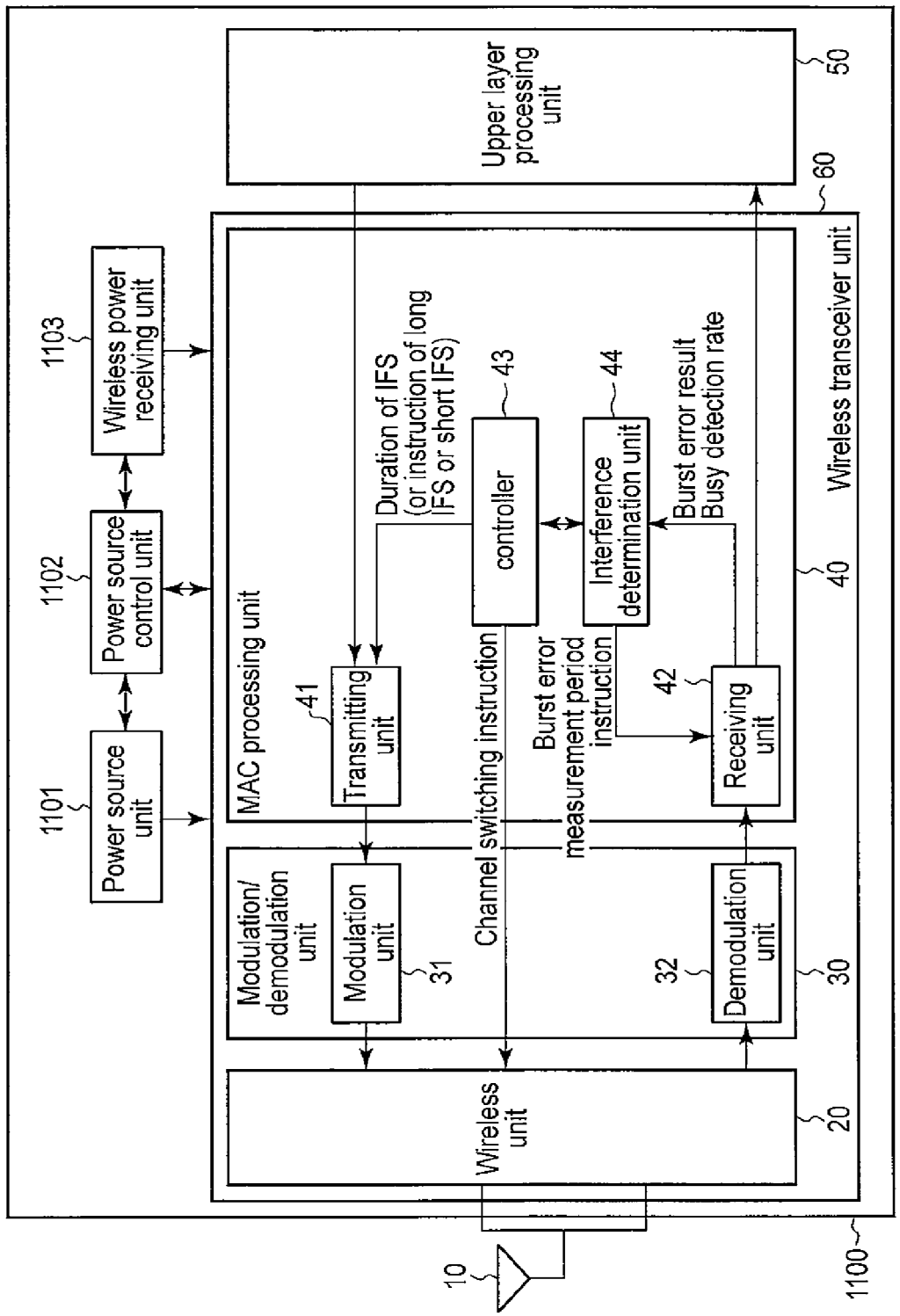
F I G. 14

WIRELESS COMMUNICATION APPARATUS AND INTERFERENCE AVOIDANCE METHOD

CROSS-REFERENCE TO RELATED APPLICATIONS

This application is based upon and claims the benefit of priority from prior Japanese Patent Application No. 2011-184123, filed Aug. 25, 2011, the entire contents of which are incorporated herein by reference.

FIELD

Embodiments described herein relate generally to a wireless communication apparatus, and an interference avoidance method.

BACKGROUND

Today, as a wireless system technique for high-speed transmission using a millimeter waveband, the WirelessHD standard has been established, and such a wireless system technique is being standardized for existing wireless local area networks (in particular, the 802.11a/b/g networks).

It is problem for a wireless system using a millimeter waveband to coexist with other wireless systems on the same frequency band.

In order for different wireless systems to coexist on the same frequency band, a given wireless system needs to recognize interference (to be referred to as "giving interference" hereinafter) which is given by the system to another wireless system (for example, a system conforming to the wirelessHD standard, a wireless LAN system being standardized, or the like) and/or interference (to be referred to as "receiving interference" hereinafter) which is received at the system from the other wireless system, and to perform processing (for example, processing of switching a frequency channel) for coexisting with the other wireless system on the same frequency band based on the recognized giving interference situation and/or receiving interference situation.

Conventionally, processing of recognizing an giving interference situation and/or receiving interference situation with the other wireless system and processing for coexisting with the other wireless system are under consideration in cognitive communication. For example, a method of estimating an giving interference situation, a method of determining a channel to be used, and the like are considered. In this case, each wireless communication apparatus in a given wireless system receives a signal transmitted/received by another wireless system coexisting on the same frequency band, and uses control information contained in the received signal to determine whether to change a frequency channel to be used. For example, each wireless communication apparatus estimates, based on a received power, an antenna gain, amplifier gain information, and the like, whether transmission by itself has an influence on a wireless communication apparatus in another wireless system. If the apparatus estimates that transmission has an influence, it determines to change a frequency channel; otherwise, it determines not to change a frequency channel. Alternatively, for example, each wireless communication apparatus estimates, based on scheduling information of another wireless system, whether there is a time during which the apparatus itself can transmit/receive a signal without influencing any wireless communication apparatus in the other wireless system. If the apparatus estimates that there is no such time, it determines to change a frequency channel; otherwise, it determines not to change a frequency channel.

This technique, however, has a disadvantage that it is necessary to recognize contents of control information by receiving a signal transmitted/received in another wireless system, and decoding the received signal.

In contrast, in a conventional wireless LAN, access control is performed in CSMA/CA scheme. According to the access control, each wireless communication apparatus measures and detects the occupancy status of a wireless channel before using it, and sets random backoff before transmission, thereby enabling a plurality of wireless communication apparatuses to fairly use a band.

On the other hand, as a method which emphasizes facilitation of connection and an improvement in efficiency, there is considered a technique of performing, by assuming a one-to-one connection, random backoff in transmitting a control signal until a connection is established, and transmitting/receiving a signal at a regular interval (for example, an SIFS, a DIFS, or the like in an IEEE 802.11 wireless LAN) without backoff after the connection is established.

If, for example, to increase the speed of transmission/reception, frames are transmitted using a short interframe space as compared with other interframe spaces for a given period after a connection is established, a wireless communication apparatus in another wireless system cannot transmit/receive a signal depending on the giving interference/receiving interference relationship with the other wireless system. That is, assume that the other wireless system is a wireless LAN system which detects the occupancy status of a wireless channel before using it. In this case, if frames having short interframe spaces are successively transmitted, the wireless communication apparatus in the other wireless system detects a busy state, thereby disabling to transmit/receive a signal while the frames are successively transmitted. This causes a problem that fairness is not ensured.

Conventionally, there is unknown a technique which enables a given wireless system to estimate an giving interference situation and receiving interference situation without receiving and decoding a signal transmitted/received in another wireless system on the same frequency band, and to select, based on the estimation result, processing necessary for coexisting with the other wireless system while ensuring fairness for the other wireless system.

BRIEF DESCRIPTION OF THE DRAWINGS

FIG. 5 is a view for explaining the relationship between interference and an interframe space used when transmitting/receiving frames in a first wireless system;

FIG. 6 is a table for explaining interference estimation and selection of coexistence processing according to the first embodiment;

FIG. 7 is a flowchart illustrating a processing example in the first wireless system according to the first embodiment;

FIG. 8 is a block diagram showing an example of a wireless communication apparatus according to the first embodiment;

FIG. 9 is a table for explaining interference estimation and selection of coexistence processing according to the second embodiment;

FIG. 11 is a table for explaining interference estimation and selection of coexistence processing according to the third embodiment;

FIG. 14 is a block diagram showing a configuration example of a wireless communication apparatus in a first wireless system according to the 10th embodiment.

DETAILED DESCRIPTION

A wireless communication apparatus according to embodiments of the present invention will be described in detail below with reference to the accompanying drawings. Note that components with the same reference number perform the same operation, and a repetitive description thereof will be omitted.

In general, according to one embodiment, a wireless communication apparatus in a first wireless communication system is provided with a transmitting unit, a receiving unit, an interference determination unit and an controller. The transmitting unit transmits frames, using a frequency channel selected from a plurality of frequency channels, and using a short interframe space or long interframe space as compared with an interframe space of a specific type of frame used in a second wireless communication system, wherein the second wireless communication system uses the frequency channel which may interfere with the first wireless communication system, and has a communication range wider than that of the first wireless communication system. The receiving unit receives frames using the selected frequency channel. The interference determination unit determines at least one of an error characteristic in the received frames and a busy status of the frequency channel in use. The controller controls, based on at least one of the error characteristic and the busy status, whether to change the frequency channel, to change a duration of the interframe space, or not to change the frequency channel and the duration.

According to the embodiment, a given wireless system can estimate an giving interference situation and receiving interference situation without receiving and decoding a signal transmitted/received in another wireless communication system on the same frequency band, and select, based on the estimation result, processing necessary for coexisting with the other wireless system while ensuring fairness for the other wireless system.

A wireless communication system according to the embodiments will be referred to as a "first wireless system" hereinafter. A configuration example of each wireless communication apparatus included in the first wireless system will be described later.

Assume in the embodiments that there may be another wireless communication system (one or a plurality of wireless communication systems) in which interference with the "first wireless system" may occur. Such wireless communication system will be referred to as a "second wireless system" hereinafter.

(First Embodiment)

Figure 1:
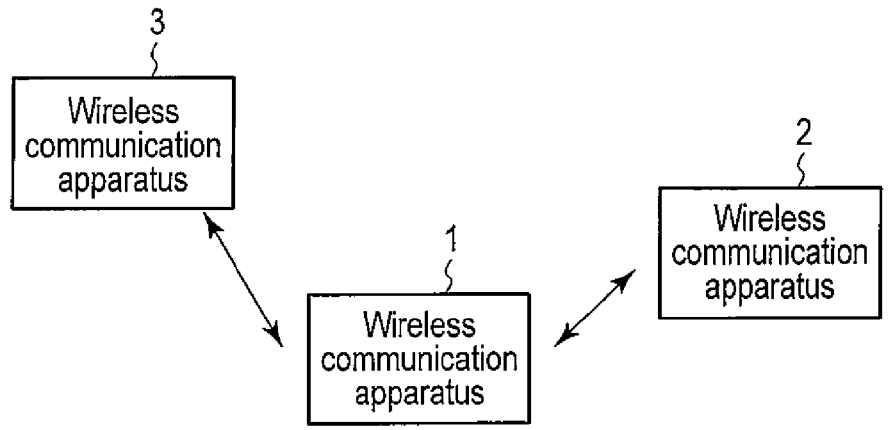
FIG. 1 is a view showing a example of a wireless communication system according to the first to 17th embodiments.

FIG. 1 shows an example of a wireless communication system, that is, a first wireless system according to this embodiment.

As a practical example of the first wireless system, a wireless system which has a communication range of only about several tens of centimeters and uses near-field communication is assumed (but the embodiments are not limited to this). Assume in the first wireless system that only several wireless communication apparatuses are connected with one wireless communication apparatus since only wireless communication apparatuses within the short communication range have a mutual influence on each other. In the example of FIG. 1, three wireless communication apparatuses 1 to 3 are included in the first wireless system. The number of wireless communication apparatuses included in the first wireless system, however, is not limited to three.

As in the first embodiment, in a wireless communication system which has a communication range of up to several tens of centimeters, only several wireless communication apparatuses within the communication range have a mutual influence on each other. In such case, therefore, it is desirable to provide a method which emphasizes facilitation of connection and an improvement in efficiency rather than a method which emphasizes "interference avoidance" and "fairness of a wireless band" in a conventional wireless LAN, that is, for example, a method in which one given wireless communication apparatus as an access point transmits a broadcast signal (for example, a beacon signal), and each wireless communication apparatus performs a random backoff control every time the each wireless communication apparatus transmits a signal. As an example of the method which emphasizes facilitation of connection and an improvement in efficiency, the following method is considered. That is, to transmit a signal, the method transmits/receives a control signal (for example, a Connect Request signal) between wireless communication apparatuses for starting a connection using, for example, a random backoff control, and initially sets an interframe space shorter than that of a specific type of frame of another wireless system (for example, an IEEE 802.11 wireless system), as an interframe space to be used first after connection establishment processing completes, thereby performing frame transmission. After that, an interframe space adjustment (IFS adjustment) is performed.

Note that the same goes for the second embodiment. Conversely, in the third embodiment, an interframe space longer than that of a specific type of frame of another wireless system (for example, an IEEE 802.11 wireless system) is initially set as an interframe space to be used first after connection processing completes, frames are transmitted, and then an interframe space adjustment (IFS adjustment) is performed. Furthermore, in the fourth embodiment, whether the above-described short interframe space or long interframe space is initially set as an interframe space to be used first after connection processing completes is selected every time.

An giving interference situation and receiving interference situation between the first wireless system and the second wireless system will be described next with reference to FIGS. 2 to 4.

Figure 2:
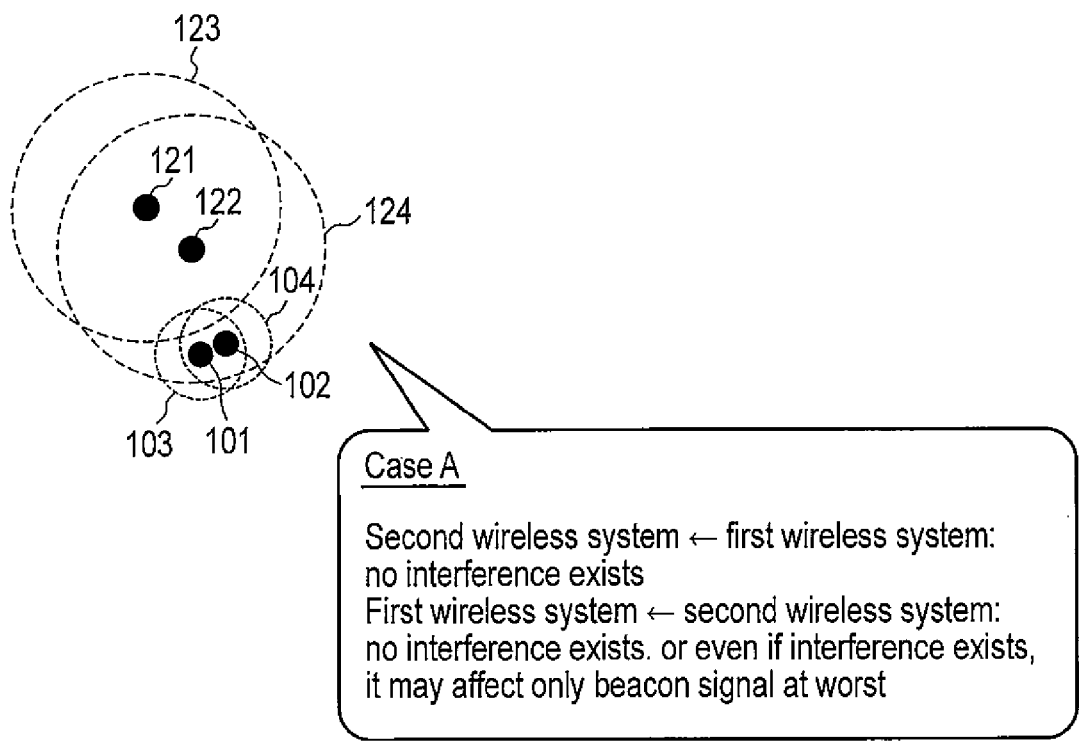
FIG. 2 is a view for explaining the giving interference and receiving interference relationship between wireless systems (case A)
Figure 3:
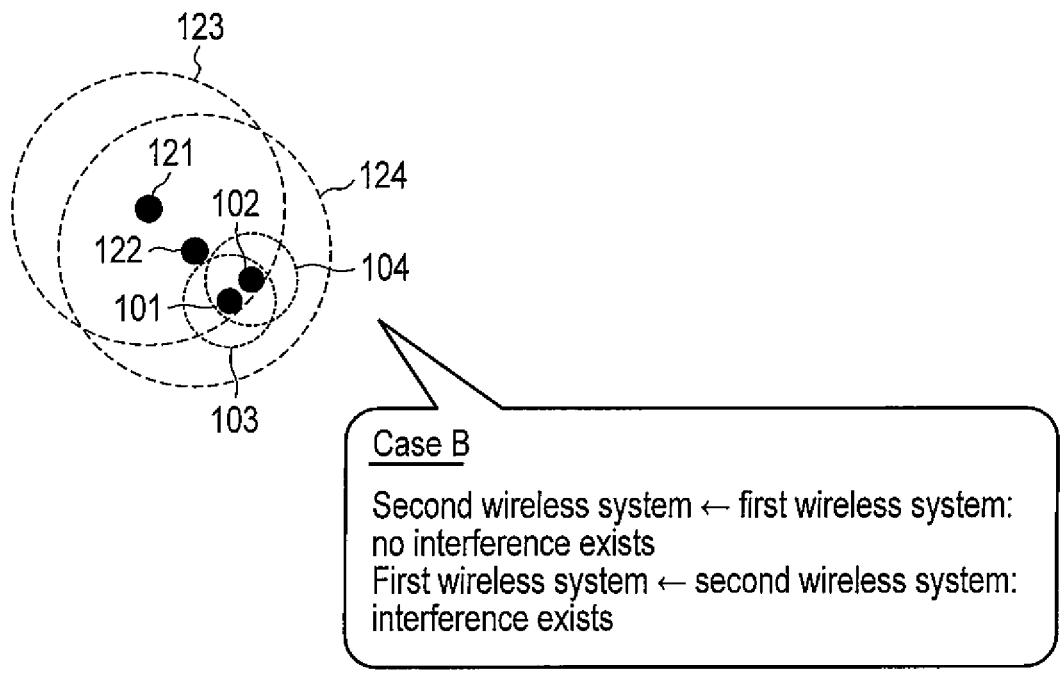
FIG. 3 is a view for explaining the giving interference and receiving interference relationship between wireless systems (case B)
Figure 4:
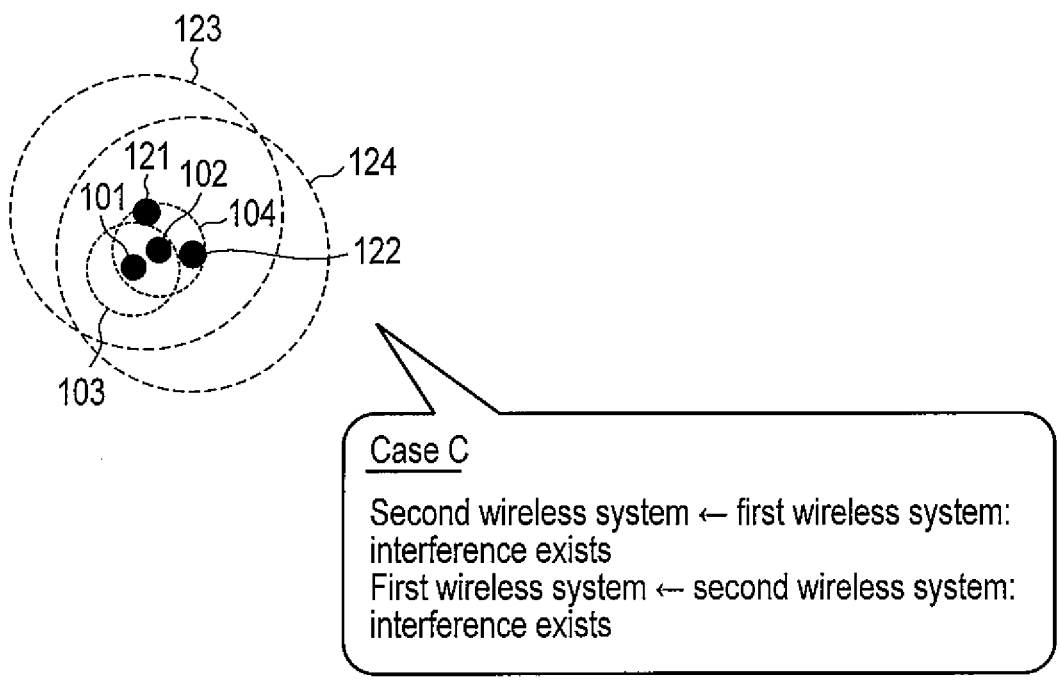
FIG. 4 is a view for explaining the giving interference and receiving interference relationship between wireless systems (case C)

Referring to FIGS. 2 to 4, reference numbers 101 and 102 denote wireless communication apparatuses included in the first wireless system; 103 and 104, the communication ranges of the wireless communication apparatuses 101 and 102, respectively; 121 and 122, wireless communication apparatuses included in the second wireless system; and 123 and 124, the communication ranges of the wireless communication apparatuses 121 and 122, respectively.

Assume that the whole or part of a frequency band used in the second wireless system overlaps the whole or part of a frequency band used in the first wireless system. In this embodiment, the frequency band is assumed to be, for example, a millimeter waveband.

Assume also that the communication range of wireless communication in a communication method used in the second wireless system is wider than that (for example, a radius of several tens of centimeters, as described above) of wireless communication in a communication method used in the first wireless system. This means, for example, that the sum of a maximum transmission power and an antenna gain in a wireless communication apparatus of the second wireless system is higher than that in a wireless communication apparatus of the first wireless system. As a practical example of the communication range of the second wireless system, for example, a radius of several m is assumed (but the embodiments are not limited to this). Although examples of the second wireless system include, for example, but not limited to wirelessHD, IEEE 802.11ad, and WiGig systems.

Note that, in this embodiment, the number of different types of wireless systems using the same frequency band is not limited to two as shown in FIGS. 2 to 4. For example, as another wireless system corresponding to the "second wireless system", there may be only one type of wireless system, or two or more types of wireless systems. In either case, however, the configuration and operation of each wireless communication apparatus in the "first wireless system" are basically the same. For simplicity of description, as shown in FIGS. 2 to 4, a case in which there exists only one type of wireless system corresponding to the "second wireless system" will be described below.

Although FIGS. 2 to 4 each show a case in which two wireless communication apparatuses exist in each wireless system. But the number of wireless communication apparatuses existing in each wireless system is not limited to two. Additionally, the number of wireless communication apparatuses may be different for each wireless system.

FIGS. 2 to 4 each show an environment in which there exist the wireless communication apparatuses 101 and 102 of the first wireless system and the wireless communication apparatuses 121 and 122 of the second wireless system. With respect to the relative positional relationship between the wireless systems (the relative positional relationship between wireless communication apparatuses which respectively belong to different wireless systems), FIGS. 2 to 4 are different from each other. Referring to FIGS. 2 to 4, a difference in relative positional relationship emerge as a difference in giving interference and receiving interference status.

A case shown in FIG. 2 (to be referred to as case A) may occur when the wireless communication apparatuses 101 and 102 in the first wireless system are separated from the wireless communication apparatuses 121 and 122 in the second wireless system such that they never or almost never interfere with each other. In case A, the first wireless system gives no interference to the second wireless system. With respect to interference received by the first wireless system from the second wireless system, (i) there is no interference, or (ii) even if there is interference, it is rare to detect a busy state (for example, only when a transmission power is large and a beacon signal which is expected to be broadcast without beam forming is received). If beam forming is performed in the second wireless system, case A applies when a beam does not overlap the first wireless system. In this case, since the channel occupancy rate of a beacon signal is low, an influence is small when the first wireless system cannot transmit/receive a signal only while the beacon signal exists. In case A, therefore, the first wireless system and the second wireless system can coexist without any specific control.

In a case shown in FIG. 3 (to be referred to as case B), the first wireless system gives no interference to the second wireless system but the second wireless system gives interference to the first wireless system. When there is a great difference in the sum of a maximum transmission power and an antenna gain between the first wireless system and the second wireless system (and the wireless communication apparatuses 101 and 102 in the first wireless system come closer to the wireless communication apparatuses 121 and 122 in the second wireless system as compared with case A), it is considered that case B may occur. Alternatively, when the second wireless system performs beam forming, it is considered that case B may occur.

A case shown in FIG. 4 (to be referred to as case C) may occur when the wireless communication apparatuses 101 and 102 in the first wireless system are in proximity to the wireless communication apparatuses 121 and 122 in the second wireless system. In case C, the first wireless system and the second wireless system detect a transmission/reception signal of one another, which results in interference. That is, the first wireless system gives interference to the second wireless system and vice versa.

Note that in addition to cases A to C, there is a case (to be referred to as case D) in which the wireless communication apparatuses 101 and 102 in the first wireless system are separated from the wireless communication apparatuses 121 and 122 in the second wireless system by a considerable distance, and they never interfere with each other at all. In this embodiment, however, case D is considered to be included in case A.

With respect to case B (FIG. 3) and case C (FIG. 4), of the above-described three cases, in which there is interference between the wireless systems, the relationship between "interference" and "the duration of an interframe space (IFS) used in the first wireless system" will be described with reference to FIG. 5.

Note that in FIG. 5, Data indicates data to be transmitted/received, A indicates ACK (Acknowledgement), and BA indicates Block ACK.

In a plurality of embodiments described in this specification, by comparison with respect to "the interframe space of a specific type of frame", an IFS shorter than that in the other wireless system (for example, an IEEE 802.11 wireless system or the like) or an IFS (which may include an IFS equal to that in the other wireless system) longer than that in the other wireless system is basically used.

The first wireless system assumes that, for example, wireless communication apparatuses on the transmitting side and the receiving side use the above short IFS or long IFS when transmitting/receiving frames after a connection is established. To transmit/receive frames in the other wireless system such as an IEEE 802.11 wireless system, whether to set the short IFS or long IFS as compared with the shortest interframe space of AIFSs (Arbitration Interframe Spaces) to be used is changed before transmitting the frames.

Using the short IFS in the first wireless system means that transmission/reception of a wireless communication apparatus in the first wireless system may have (highest) priority. On the other hand, using the long IFS in the first wireless system means that transmission/reception of a wireless communication apparatus in the first wireless system may be (most) deferred.

Which of the short IFS and long IFS is to be used is determined by the following methods. That is, there are a method of setting the short IFS in advance as exemplified in the first and second embodiments, a method of setting the long IFS in advance as exemplified in the third embodiments, and a method of dynamically changing the setting according to a predetermined criterion as exemplified in the fourth embodiment.

Note that if there are a plurality of other wireless systems, an IFS shorter than an interframe space of a specific type of frame used in any other wireless system may be used as the "short IFS", and an IFS longer than that in any other wireless system may be used as the "long IFS".

Referring to FIG. 5, (a) and (b) show a case in which the first wireless system transmits frames using the short IFS, and (c) and (d) show a case in which the first wireless system transmits frames using the long IFS. Furthermore, (a) and (c) show case B (FIG. 3), and (b) and (d) show case C (FIG. 4).

In case B shown in (a) and (c) of FIG. 5, since a transmission frame in the first wireless system does not interfere with the second wireless system, the second wireless system transmits/receives data independently of the first wireless system. Regardless of whether the first wireless system uses the short IFS or long IFS, therefore, when transmission/reception of the second wireless system starts, transmission/reception of the first wireless system is (unilaterally) interfered with during the transmission/reception of the second wireless system, and an error occurs in a received frame.

On the other hand, in case C shown in (b) and (d) of FIG. 5, a transmission frame of the first wireless system interferes with the second wireless system. When, therefore, the first wireless system starts transmission/reception, the second wireless system detects that a channel is busy during idle state, and waits to its transmission/reception until the channel is cleared. The idle state denotes a state during which a carrier sense is performed without a transmission/reception.

In (b) of FIG. 5, the first wireless system sets the short IFS. After the channel is cleared, the first wireless system starts to transmit a next frame before the second wireless system. The second wireless system, therefore, detects a busy state, and cannot actually start transmission/reception until the first wireless system completes transmission/reception of successive frames.

Conversely, in (d) of FIG. 5, the first wireless system sets the long IFS. After the first wireless system transmits/receives a frame, therefore, the second wireless system can start transmission/reception at a high probability.

Thus, as a method of coexisting while ensuring fairness on the same frequency channel, it is considered to control an interframe space in the first wireless system. As in the example of FIG. 5, however, "whether this method is effective depends on the relationship with interference".

In consideration of these problems, the following mechanism is provided. That is, without receiving and decoding a signal of another wireless system (the second wireless system in this case), the first wireless system determines case A in which there is no interference (or almost no interference) between the wireless systems, case B in which there is unilateral interference between the wireless systems, or case C in which the wireless systems interfere with each other to which the giving interference and receiving interference relationship between the first wireless system and the second wireless system in the current status applies. Depending on the determination result, processing for coexistence is selected.

In the first embodiment, the first wireless system is based on the use of the short IFS, and determines, based on a frame error characteristic during frame transmission/reception using the short IFS, whether case B or another case (that is, case A or C) applies. Furthermore, based on "ease of frame transmission/reception" after changing the IFS of the first wireless system from the short IFS to the long IFS, the first wireless system determines whether case A or C applies. The "ease of frame transmission/reception" is determined using a busy status such as "a busy detection rate indicating the probability of a busy state" or "a busy occupancy ratio indicating a time ratio during which it is detected that a channel is busy".

FIG. 6 is a table showing interference estimation and selection of coexistence processing based on an estimation result according to the first embodiment. FIG. 7 is a flowchart illustrating processing for interference estimation and selection of coexistence processing based on an estimation result according to the first embodiment.

As described above with reference to FIG. 5, in a case (see (b) of FIG. 5) in which, when frames are transmitted/received using the short IFS, transmission/reception of the first wireless system gives interference to the second wireless system, the second wireless system determines based on the transmission/reception of the first wireless system that a channel is busy, and does not perform transmission. Then, even after the channel is cleared, the first wireless system starts transmission/reception of a next frame using the short IFS, and therefore, the second wireless system is in a transmission standby state. Not only in case A (the wireless systems never or almost never interfere with each other) but also in case C (transmission/reception of the first wireless system gives interference to the second wireless system), the rate of occurrence of a frame error in transmission/reception using the short IFS by the first wireless system is considered to be low.

On the other hand, in case B, the second wireless system transmits/receives data independently of transmission/reception of the first wireless system. An error may occur in transmission/reception of the first wireless system due to interference from the second wireless system regardless of the duration of the interframe space of the first wireless system. It is, therefore, considered that the rate of occurrence of a frame error in frame transmission/reception is high.

In the interference estimation and coexistence processing according to the first embodiment, a frequency channel selected from a plurality of frequency channels is used to transmit/receive frames using the short IFS for a given period, thereby measuring an error characteristic in frame transmission/reception (step S11). To measure the given period, for example, a timer T1 (not shown) is set in step S11. On timeout, it is determined that the period has elapsed. In this way, by managing a measurement time using a timer, it is possible to obtain a more reliable measurement result such as an average for the given period.

After the given period elapses (in the example of FIG. 7, after the timer T1 times out), an error characteristic in frame transmission/reception for the given period is checked. For example, errors which occur in successive N or more transmission frames are defined as a burst error (Note that N is a predefined integer of 2 or larger). It is then determined whether a burst error has occurred during the given period, and the process branches based on the determination result (step S12).

In case B, a burst error occurs in the example described in the first embodiment (see (a) of FIG. 5 and FIG. 6).

If it is determined in step S12 that a burst error has occurred, therefore, it is desirable to change a frequency channel in use for interference avoidance and coexistence (step S14).

Alternatively, if it is determined in step S12 that no burst error has occurred, to discriminate whether case A or C applies, an IFS adjustment is performed and frames are transmitted/received for the given period (step S13). In the first embodiment, the initially set short IFS is changed to the long IFS.

In case A in which the wireless systems never or almost never interfere with each other, even if the IFS is changed to the long IFS, it is considered that the busy status such as a busy detection rate or a busy occupancy ratio does not change.

In case C in which wireless systems interfere with each other, when the long IFS is set as the IFS of the first wireless system, that is, when an IFS whose length is greater than or equal to that of at least a specific type of frame of the second wireless system is set, it is considered that a busy detection rate or busy occupancy ratio in a carrier sense before starting transmission becomes high.

The long IFS is set for a given period, and whether case A or C applies is determined based on "the ease of frame transmission/reception", that is, "the busy detection rate" or "the busy occupancy ratio" for the given period.

The busy detection rate or busy occupancy ratio of the frame transmission/reception using the long IFS is checked (step S15). If the rate is high (for example, if the rate is greater than or equal to a predefined threshold), it is determined that case C applies. The first wireless system continues frame transmission/reception with the long IFS set, and waits for the busy detection rate or busy occupancy ratio to become low (steps S16 and S17). If the busy detection rate or busy occupancy ratio becomes low in step S17 (for example, if the rate is smaller than the threshold), an IFS adjustment is performed so that efficient transmission/reception is achieved, that is, the long IFS is returned to the initially set short IFS, and frames are transmitted/received (step S18).

Alternatively, if the busy detection rate or busy occupancy ratio is low (for example, if the rate is smaller than the threshold), it is determined that case A applies. As described above, therefore, the long IFS is returned to the short IFS, and frames are transmitted/received (step S18).

Note that after the frequency channel is switched in step S14, for example, the processing shown in FIG. 7 may be performed again.

Also in step S18, a timer may be started. On time-out, whether it is necessary to perform an IFS adjustment may be determined, and the IFS adjustment may be performed as needed. The timer in this case has the same duration as that of the timer T1. Alternatively, the timer may have a duration longer than that of the timer T1. If the short IFS is selected, there is no interference source around the system at a somewhat high probability. By prolonging a time until interference estimation is performed next, it is possible to allow coexistence while reducing power consumed for interference estimation and coexistence determination.

In addition to the busy status (such as the busy detection rate or busy occupancy ratio) during idle state with the long IFS, the busy status during idle state with the short IFS is also measured. If, in step S15, the busy status during idle state with the long IFS is higher than that of frame transmission/reception using the short IFS (or the difference between the busy status is greater than or equal to a predefined threshold), it may be determined that case C applies. If the busy status during idle state with the long IFS does not change as compared with that of frame transmission/reception using the short IFS (or the difference between the busy statuses is smaller than the threshold), it may be determined that case A applies. The same goes for step S17. In this case, the busy status during idle state with the short IFS may be measured, for example, in step S11 or between steps S12 and S13.

Furthermore, step S18 may be omitted from FIG. 7, and the process may advance from step S15 or S17 to step S1 instead of step S18.

FIG. 8 is a schematic block diagram showing a configuration example of a wireless communication apparatus 100 (the wireless communication apparatuses 1 to 3 in FIG. 1) in the first wireless system according to this embodiment.

As shown in FIG. 8, the wireless communication apparatus 100 includes a wireless unit 20, a modulation/demodulation unit 30, a MAC processing unit 40, and an upper layer processing unit 50. The modulation/demodulation unit 30 includes a modulation unit 31 and a demodulation unit 32. The MAC processing unit includes a transmitting unit 41, a receiving unit 42, an controller 43, and an interference determination unit 44. The wireless unit 20, modulation/demodulation unit 30, and MAC processing unit 40 collectively form a wireless transceiver unit 60. Note that reference number 10 denotes an antenna.

An overview of the operation of the wireless communication apparatus 100 when transmitting a signal will be described.

The transmitting unit 41 temporarily accumulates a frame output from the upper layer processing unit 50 in an internal transmission buffer. The transmitting unit 41 then performs processing of, for example, adding a MAC header to the frame, and outputs the frame to the modulation unit 31 in the accumulation order.

The modulation unit 31 performs, for the frame received from the transmitting unit 41, processing associated with a physical layer such as encoding processing, modulation processing, and addition of a physical header, and then outputs the frame to the wireless unit 20.

The wireless unit 20 performs, for the frame received from the modulation unit 31, digital-to-analog conversion processing and frequency conversion into a frequency band for wireless communication, and then transmits the frame via the antenna 10.

In the above description, assume that the transmission buffer resides within the transmitting unit 41. Instead, the transmission buffer may reside in a unit other than the transmitting unit 41 within the wireless transceiver unit 60 or may reside in a unit (for example, the upper layer processing unit 50 or the like) other than the wireless transceiver unit 60, or any combination of them is also possible.

An overview of the operation of the wireless communication apparatus 100 when receiving a signal will be described.

A signal received via the antenna 10 is given to the wireless unit 20.

The wireless unit 20 performs, for the received signal, frequency conversion into a baseband and analog-to-digital conversion processing, and then outputs the digitized signal to the demodulation unit 32.

The demodulation unit 32 performs, for the digitized signal, processing such as demodulation processing and analysis of a physical header, and then outputs the demodulated frame to the MAC processing unit 40.

The receiving unit 42 of the MAC processing unit 40 performs processing such as analysis of a MAC header for the demodulated frame. If the received frame is transmitted from the correspondent node of the wireless communication apparatus 100 and received frame has its frame body data, the receiving unit 42 outputs the frame body of the received frame to the upper layer processing unit 50.

In the wireless communication apparatus 100 of the wireless system of this embodiment, which performs interference estimation and selects coexistence processing based on an estimation result while transmitting/receiving frames using an IFS interframe space, the MAC processing unit 40 includes the interference determination unit 44 and the controller 43. The interference determination unit 44 is connected with the controller 43 and the receiving unit 42. The controller 43 connects with the interference determination unit 44, the transmitting unit 41, and the wireless unit 20 associated with channel switching, and may also connect with the modulation/demodulation unit 30 as needed.

The interference determination unit 44 instructs the receiving unit 42 to "acquire an error characteristic"/"check the busy status" at an appropriate time. The interference determination unit 44 receives a "reception error occurrence report" from the receiving unit 42, calculates "a reception error characteristic" for a given period, and then sends the result to the controller 43 after the given period elapses. Similarly, the interference determination unit 44 receives a "busy detection report" from the receiving unit 42, calculates a busy status such as "a busy detection rate or busy occupancy ratio" for a given period, and then sends the result to the controller 43 after the given period elapses.

Based on the determination results by the interference determination unit 44, the controller 43 determines whether case A, B, or C applies. More specifically, in the first embodiment, the unit 43 determines based on the error characteristic whether case B or case A/C applies, and then determines based on the busy status whether case A or C applies. Note that, as will be described in the second to fourth embodiments, other determination procedures are available.

To perform channel switching, the controller 43 sends a channel switching instruction to the wireless unit 20. To perform an IFS adjustment, the controller 43 notifies the transmitting unit 41 of an IFS adjustment instruction or a changed IFS setting value.

The interference determination unit 44 may be configured to have a function of managing a timer to measure an "error characteristic"/"busy status" for a given period based on the timer. Alternatively, a timer unit having a function of managing a timer may be provided somewhere in the wireless communication apparatus 100 of FIG. 8, and the interference determination unit 44 may be configured to be connected with the timer unit.

As described above, according to this embodiment, without receiving and decoding a transmission/reception signal in another wireless system coexisting on the same frequency band, each wireless communication apparatus in the first wireless system can estimate the giving interference and receiving interference relationship with the other wireless system using an index such as an error characteristic or the busy status of a frequency channel in frame transmission/reception, and can select, based on the estimation result, coexistence processing (a frequency channel change, an IFS adjustment, and the like) while ensuring fairness.

(Second Embodiment)

The second embodiment, mainly different points from the first embodiment, will be described.

The description given with reference to FIGS. 1 to 5 is basically applicable to the second embodiment. A configuration example of a wireless communication apparatus in a first communication system according to the second embodiment is the same as that shown in FIG. 8.

In the first embodiment, a case in which whether case B or another case applies is determined based on an error characteristic and then whether case A or C applies is determined after an IFS adjustment has been described. With respect to a point in which the first wireless system basically uses a short IFS, the second embodiment is the same as the first embodiment. In the second embodiment, however, after transmitting/receiving frames using the short IFS for a given period, whether case A, B, or C applies is determined using two indices, that is, a busy status such as a busy detection rate or busy occupancy ratio in transmission/reception or connection processing, and a frame error characteristic in frame transmission/reception.

Figure 10:
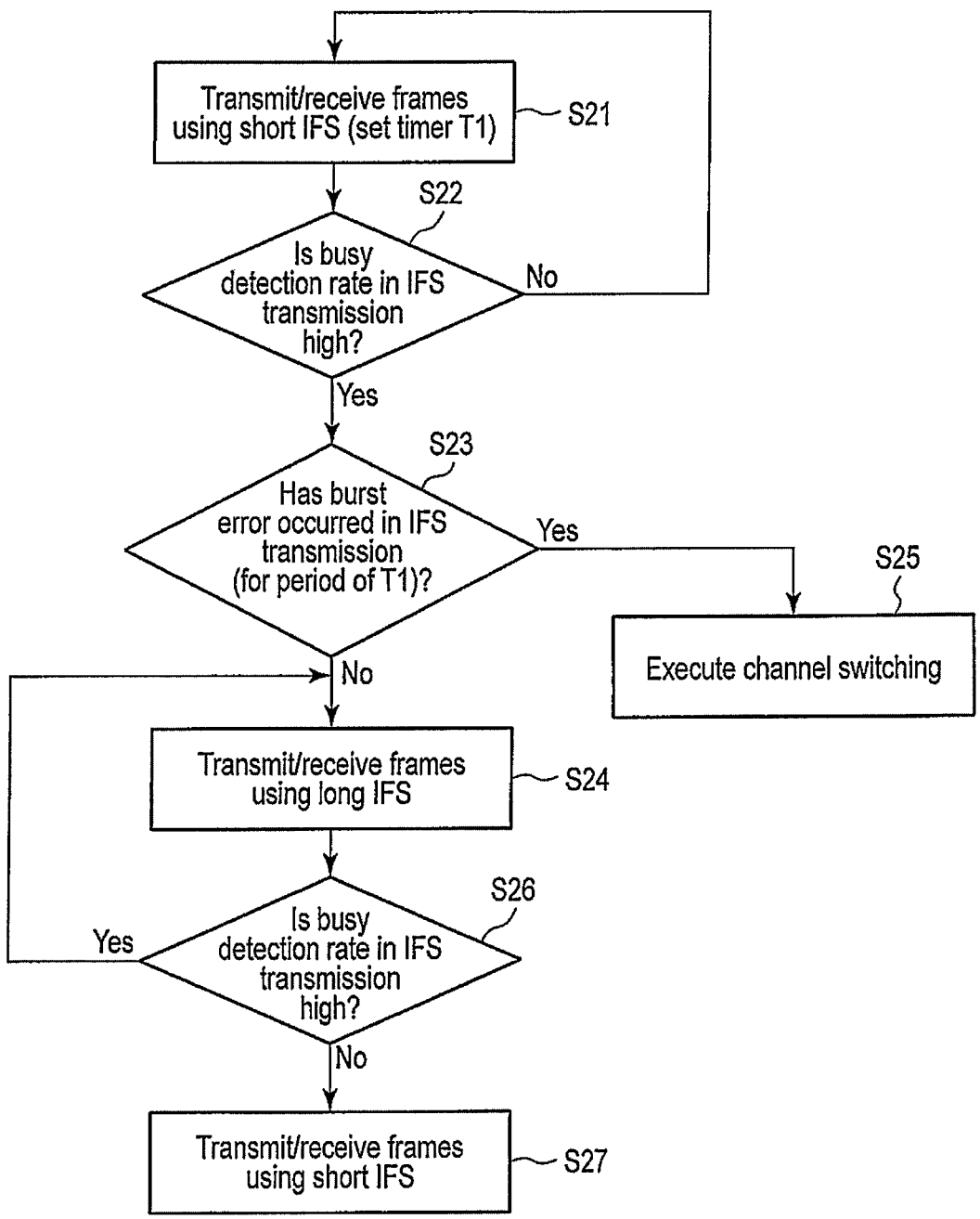
FIG. 10 is a flowchart illustrating a processing example in the first wireless system according to the second embodiment.

FIG. 9 is a table showing interference estimation and selection of coexistence processing based on an estimation result according to the second embodiment. FIG. 10 is a flowchart illustrating processing for interference estimation and selection of coexistence processing based on an estimation result according to the second embodiment.

As described above in the first embodiment, to transmit/receive frames in the first wireless system, an IFS shorter than that of the interframe space of a specific type of frame of another wireless system such as an IEEE 802.11 wireless system is used to transmit successive frames. With respect to an error characteristic after starting transmission/reception of the first wireless system, case A is the same as case C.

On the other hand, when frames are transmitted/received successively in connection processing, a carrier sense is performed at least in transmitting a first frame. Thus, in case C in which a plurality of wireless systems interfere with each other, therefore, it may be detected at a high probability that a channel is busy in a carrier sense, as compared with case A. In the second embodiment, a busy detection rate or busy occupancy ratio at start of transmission or in connection processing is used to determine whether case A or C applies.

As in the first embodiment, in the interference estimation and coexistence processing according to the second embodiment, a frequency channel selected from a plurality of frequency channels is used to transmit/receive frames using the short IFS for a given period, thereby measuring a busy detection rate or busy occupancy ratio in the frame transmission/reception (step S21).

The busy detection rate or busy occupancy ratio is checked (step S22). If the busy detection rate or busy occupancy ratio is low (for example, if the rate is smaller than a predefined threshold), it is determined that case A (that is, a case in which no other wireless system exists within a range where the first wireless system is influenced or if it exists, the influence is expected to be small) applies. The process then returns to step S21 to continue the frame transmission/reception using the short IFS.

Alternatively, if the busy detection rate or busy occupancy ratio is high (for example, if the rate is greater than or equal to the threshold), an error rate characteristic is checked (step S23). If a burst error has occurred, it is determined that case B applies and channel switching is instructed (step S25).

If no burst error has occurred, it is determined that case C applies. It is then determined that transmission/reception of the first wireless system has been detected as a busy state in the carrier sense of the second wireless system, and the IFS is changed to a long IFS to transmit/receive frames for ensuring fairness (step S24).

After that, a busy detection rate or busy occupancy ratio in frame transmission/reception using the long IFS is checked (step S26). If the rate is low (for example, if the rate is smaller than the threshold), frames are transmitted/received using the short IFS again (step S27).

After switching a frequency channel in step S25, the processing shown in FIG. 10 may be performed again.

FIG. 10 shows a case in which after changing to the long IFS in step S24, the long IFS is continuously used until the busy detection rate or busy occupancy ratio becomes low. However, for example, when a timer is used and time-out occurs, the IFS may be returned to the short IFS, and an IFS adjustment may be performed for each given period until the busy detection rate or busy occupancy ratio becomes low.

Furthermore, step S27 may be omitted from FIG. 10, and the process may advance from step S26 to step S21 instead of step S27.

Note that, as shown in FIG. 9, in the second embodiment, it is possible to determine based on a combination of an error characteristic and a busy status whether case A, B, or C applies. In FIG. 10, a determination is made based on a busy status and then a determination is made based on an error characteristic. Instead, the order of steps S22 and S23 can be reversed to make a determination based on an error characteristic and then make a determination based on a busy status. Alternatively, it is also possible to integrate steps S22 and S23 into one step and to collectively make a determination based on an error characteristic and a busy status.

As described above, according to the embodiment, using two parameters obtained by transmission/reception processing of each wireless communication apparatus in the first wireless system, that is, an error characteristic and the busy status (such as a busy detection rate or busy occupancy ratio) of a channel in frame transmission/reception, it is possible to determine the relationship with another wireless system, and to select processing necessary for coexistence.

(Third Embodiment)

The third embodiment, mainly different points from the above-described embodiments, will be described.

The description given with reference to FIGS. 1 to 5 is basically applicable to the third embodiment. A configuration example of a wireless communication apparatus in a first communication system according to the third embodiment is the same as that shown in FIG. 8.

In the first and second embodiments, to increase the speed and the efficiency, the following processing has been described for the first wireless system. That is, a short IFS is basically selected to perform transmission/reception after connection, and if the first wireless system has the giving interference/receiving interference relationship with another wireless system, a channel is changed or the IFS is changed to a long IFS.

To minimize interference (giving interference) given to another wireless system, a method of recognizing a situation by setting first transmission/reception after connection to use the long IFS is considered.

In the third embodiment, a case in which frame transmission/reception starts by setting the long IFS after connection will be described.

Figure 12:
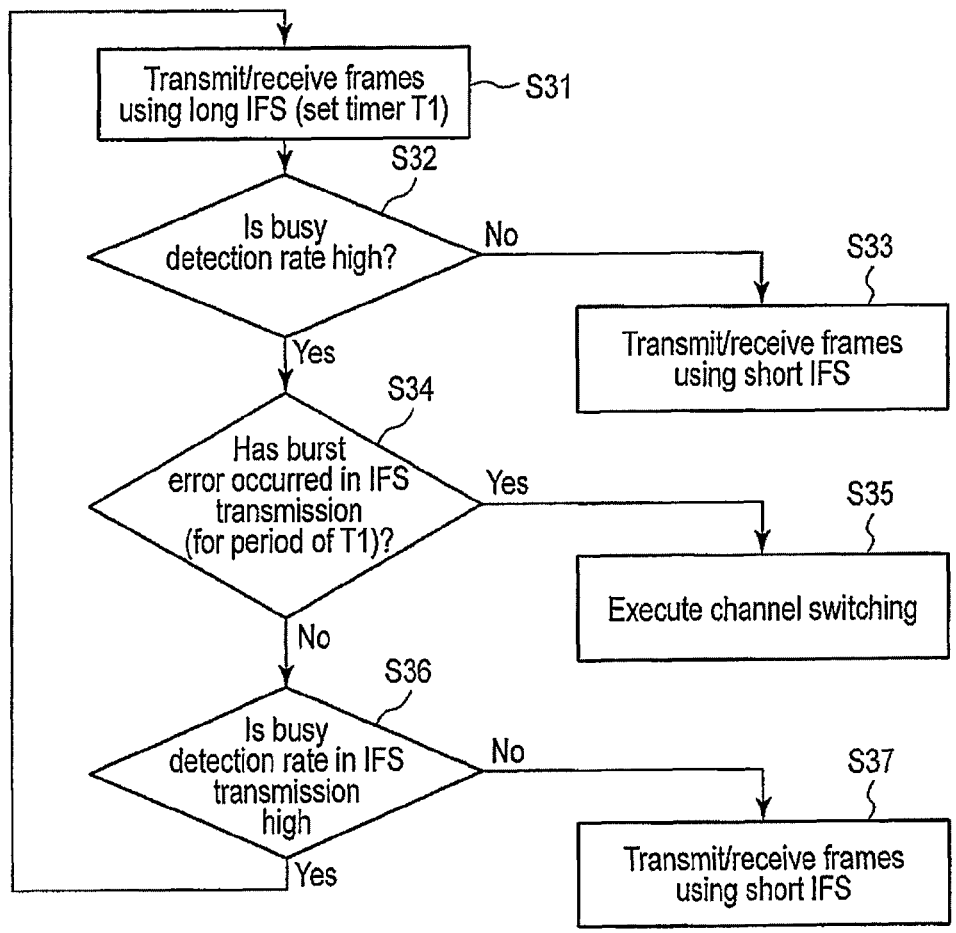
FIG. 12 is a flowchart illustrating a processing example in the first wireless system according to the third embodiment.

FIG. 11 is a table showing interference estimation and selection of coexistence processing based on an estimation result according to the third embodiment. FIG. 12 is a flowchart illustrating processing for interference estimation and selection of coexistence processing based on an estimation result according to the third embodiment.

The third embodiment is the same as the second embodiment in that the relationship with another wireless system is determined based on two parameters, that is, an error characteristic and the busy status (such as a busy detection rate or busy occupancy ratio) of a channel in frame transmission/reception.

In the interference estimation and coexistence processing according to the third embodiment, a frequency channel selected from a plurality of frequency channels is used to transmit/receive frames using the long IFS for a given period, thereby measuring a busy detection rate or busy occupancy ratio in the frame transmission/reception (step S31).

The busy detection rate or busy occupancy ratio is checked (step S32). If the busy detection rate or busy occupancy ratio is low (for example, if the rate is smaller than a predefined threshold), it is determined that case A (that is, a case in which no other wireless system exists within a range where the first wireless system is influenced or if it exists, the influence is expected to be small) applies. An IFS adjustment is performed to increase the speed, and then frames are transmitted/received using the short IFS (step S33).

Alternatively, if the busy detection rate or busy occupancy ratio is high (for example, if the rate is greater than or equal to the threshold), a frame error rate characteristic is checked (step S34). If a burst error has occurred, it is determined that case B applies and channel switching is instructed (step S35).

If no burst error has occurred, it is determined that case C applies and the wireless systems coexist on the same frequency channel while the long IFS remains set (that is, nothing is done in this case).

After that, a busy detection rate or busy occupancy ratio in frame transmission/reception using the long IFS is checked (step S36). If the rate is low (for example, if the rate is smaller than the threshold), frames are transmitted/received using the short IFS (step S37); otherwise, the process returns to step S31.

Note that after switching the frequency channel in step S35, for example, the processing shown in FIG. 12 may be performed again.

As shown in FIG. 11, in the third embodiment, it is possible to determine based on a combination of an error characteristic and a busy status whether case A, B, or C applies. In FIG. 11, a determination is made based on a busy status and then a determination is made based on an error characteristic. Instead, the order of steps S32 and S34 can be reversed to make a determination based on an error characteristic and then make a determination based on a busy status. Alternatively, it is also possible to integrate steps S32 and S34 into one step, and to collectively make a determination based on an error characteristic and a busy status.

Note that in case C in the example shown in FIG. 11, the long IFS is used for a period during which it is determined that there is interference, that is, a period during which a busy detection rate or busy occupancy ratio is high, in order to decrease interference (giving interference) given to another wireless system. Alternatively, a mechanism which can obtain the throughput, to some extent, of the self wireless system while ensuring fairness for another wireless system by using a timer to repeatedly use the long IFS and short IFS even for a period during which a busy detection rate and busy occupancy ratio are high may be used.

As described above, according to this embodiment, if the first wireless system has the giving interference/receiving interference relationship with another wireless system, it is possible to decrease interference given to the other wireless system by using two parameters obtained in transmission/reception processing of each wireless communication apparatus in the first wireless system, that is, an error characteristic and the busy status (such as a busy detection rate or busy occupancy ratio) of a channel in frame transmission/reception to determine the relationship with the other wireless system, and using the long IFS as a basic interframe space.

(Fourth Embodiment)

The fourth embodiment, mainly different points from the above-described embodiments, will be described.

In the first to third embodiments, as for interference estimation and a method of selecting coexistence processing based on an estimation result, a case (the first and second embodiments) in which basic IFS transmission is set to use a short IFS and a case (the third embodiment) in which a basic IFS transmission is set to use a long IFS have been described.

In the fourth embodiment, basic IFS transmission after connection is dynamically set to use a short IFS or long IFS. In the fourth embodiment, assume that a connection request signal/connection response signal are used for connection processing and that whether the short IFS or long IFS is set is determined based on the transmission ratio of connection request signals in the connection processing.

In this case, in the first wireless system, a wireless communication apparatus transmits a connection request signal, and another wireless communication apparatus transmits a connection response signal in response to receiving the connection request signal, whereby the connection processing is performed. If, at the time of attempting to transmit a connection request signal, the connection request signal transmission side detects that a channel is busy, the transmission side waits for the channel to be cleared, and performs backoff, and then transmits the signal. If there is no interference, the channel is clear. Since, therefore, it is possible to reliably transmit a connection request signal at the time of attempting to transmit the connection request signal, it is possible to transmit a given number of transmission request signals for a given period. If, as described above, the channel is busy at the time of attempting to transmit the signal, the number of transmission request signals which can be transmitted within a given period may decrease. The ratio of the number of connection request signals which can actually be transmitted to that of connection request signals which should originally be transmitted is set as the transmission ratio of transmission request signals, and an IFS setting after connection is determined using the transmission ratio as a parameter.

Figure 13:
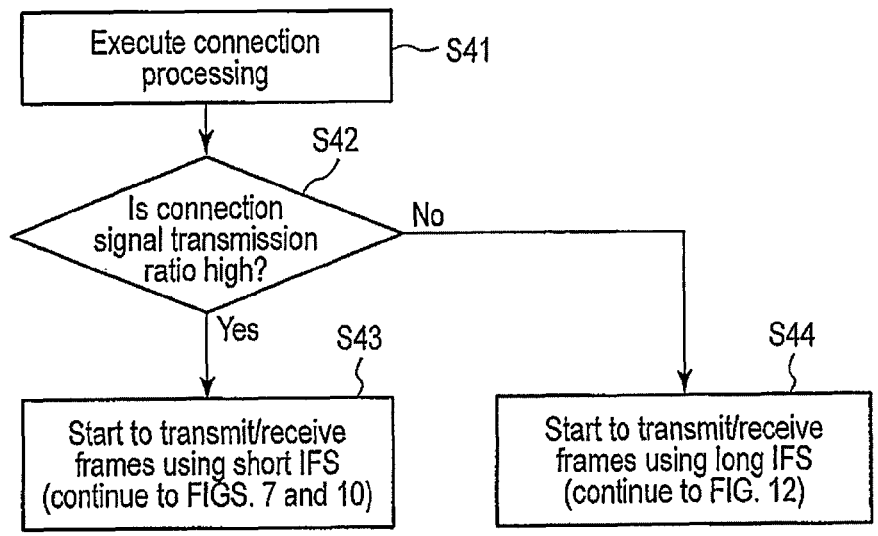
FIG. 13 is a flowchart illustrating a processing example in a first wireless system according to the fifth embodiment.

FIG. 13 is a flowchart illustrating processing in this embodiment.

Connection processing is performed as described above (step S41), and an IFS setting after connection is determined based on a transmission ratio (step S42). Note that the transmission ratio may be determined by, for example, the interference determination unit 44, and whether the short IFS or long IFS is selected may be determined by the controller 43.

If the transmission ratio is high (for example, if the ratio is greater than or equal to a predefined threshold), it is determined that another wireless system uses the same frequency channel at a low probability, and the short IFS is basically used after connection (step S43). In this case, the processing shown in FIG. 7 of the first embodiment or the processing shown in FIG. 10 of the second embodiment may be performed.

Alternatively, if the transmission ratio is low (for example, the ratio is smaller than the threshold), it is determined that another wireless system uses the same frequency channel at a high probability, and the long IFS is basically used after connection (step S44). In this case, the processing shown in FIG. 12 of the third embodiment may be performed.

As described above, according to this embodiment, if it is highly probable that another wireless system exists, it is possible to suppress interference given to the other wireless system by starting transmission/reception with the long IFS set after connection. If it is less probable that another wireless system exists, it is possible to transmit/receive frames with high efficiency by starting transmission with the short IFS set.

(Fifth Embodiment)

The fifth embodiment, mainly different points from the above-described embodiments, will be described.

In the first to fourth embodiments, as for interference estimation and a method of selecting coexistence processing based on an estimation result, several different examples have been described. Note that channel switching is instructed in the first to fourth embodiments in case B in which there is unilateral interference between wireless systems, that is, a case in which a signal from a first wireless system has no influence on a second wireless system and the first wireless system detects, as a channel busy state, a signal from the second wireless system.

In a millimeter waveband, a difference in analog reception characteristic may generally arise for each frequency channel. If, therefore, a frequency channel is changed, an obtained transmission rate or the like may decrease. Even if there is interference with another wireless system, it is not always best to change the frequency channel. It is desirable to avoid a situation that a channel having a bad characteristic is used as a result of immediate channel switching. It is also desirable to use a desirable frequency channel (which is set as a default channel) as much as possible.

In the fifth embodiment, when channel switching is designated in the selection methods of the first to fourth embodiments, whether channel switching should actually be performed or the wireless systems should coexist on the same default channel is determined instead of immediately performing channel switching.

Based on the characteristic of each frequency channel, a wireless communication apparatus can estimate a transmission rate in transmitting frames on a default channel and a transmission rate on a switched channel. Using transmission rate information and a channel clear rate (assume, for example, that "the channel clear rate=1−a channel busy detection rate") indicating a period during which it is possible to transmit/receive frames, for example, by comparing "the transmission rate on the default frequency channel×the channel clear rate" with "the transmission rate on the switched channel×the channel clear rate on the switched channel", whether to coexist on the default channel or to perform channel switching is determined. Note that, to efficiently make a determination, for example, "the channel clear rate on the switched channel" may be considered as a specific value. Although the specific value may be, for example, 1 (but not limited to 1). Note that the channel clear rate on the switched channel=1 indicates that the channel is all clear.

When whether to change the channel is determined based on the clear rate of a channel and the transmission rate obtained from the characteristic of the channel, it is possible to avoid easily changing the channel to use a channel having a bad characteristic.

As another method, depending on whether a throughput required by an application or the like is satisfied, which is determined based on "the transmission rate on the default frequency channel×the channel clear rate", whether to switch the channel may be determined.

Furthermore, it is possible to devise a frame transmission/reception method when there is interference with another wireless system and it is determined to transmit/receive frames while coexisting with the other wireless system on the same channel. For example, this applies to case C, a case in which it is determined not to switch the channel in case B as described above, or a case in which only the default channel is a corresponding channel.

If the second wireless system transmits/receives frames independently of the first wireless system as in case B, for example, it is desirable to shorten a channel occupancy time for one frame by shortening a frame length to be actually transmitted/received (decreasing the size of one frame) by dividing a frame to be transmitted into a plurality of frames called fragments to transmit them, and to decrease the number of errors in transmission/reception of a self wireless communication apparatus by transmitting/receiving frames while avoiding interference or suppressing, as much as possible, characteristic degradation due to interference. In this case, "the rate of occurrence of a frame transmission error" before fragmentation may be used to determine whether to fragment a frame.

On the other hand, when the second wireless system detects transmission/reception of the first wireless system as a busy state as in case C, it is desirable to release the channel as soon as possible by, for example, adjusting the IFS or not transmitting/receiving frames for a given period after transmitting/receiving frames with high efficiency by increasing, by aggregation or the like, a frame length to be transmitted.

As described above, according to this embodiment, by finally determining whether to perform channel switching in consideration of a difference in characteristic for each frequency channel, it is possible to suppress occurrence of a situation in which it is impossible to obtain a required throughput due to easy channel switching even when there is no interference. Even when it is basically determined that a channel change is desirable, for example, if there is a great difference in characteristic for each frequency channel, a frequency channel is not switched and coexisting on the same frequency channel is selected, thereby obtaining a higher throughput as a whole.

Variations for the above-described embodiments will be described below. Any one of the following embodiments or any combination thereof can be implemented by combining with arbitrary ones of the above-described embodiments.

(Sixth Embodiment)

In the sixth embodiment, a configuration obtained by adding a buffer to the configuration (see a wireless communication apparatus 100 of FIG. 8) of a wireless communication apparatus of a first wireless system according to any one of the above-described embodiments will be described. The buffer is connected with a transmitting unit 41 and a receiving unit 42. The buffer may reside within an upper layer processing unit 50 or may reside between the transmitting unit 41/receiving unit 42 and the upper layer processing unit 50, or a combination thereof is also possible. By configuring to include the buffer in the wireless communication apparatus, it becomes possible to hold transmission/reception data in the buffer, and to readily perform retransmission processing and/or external output processing.

(Seventh Embodiment)

In the seventh embodiment, a configuration obtained by adding a bus, a processor unit, and an external interface to the configuration of a wireless communication apparatus according to the sixth embodiment will be described. The bus is connected with a buffer described in the sixth embodiment, and the processor unit and the external interface unit are respectively connected with the bus (that is, the processor unit and the external interface unit are respectively connected with the buffer via the bus). Firmware may operate in the processor unit. The processor unit, bus, and external interface may reside in an upper layer processing unit 50 or may reside separately from the upper layer processing unit 50, or a combination thereof is also possible. By configuring to include firmware in the wireless communication apparatus, it becomes possible to readily change the function of the wireless communication apparatus by rewriting the firmware.

(Eighth Embodiment)

In the eighth embodiment, a configuration obtained by adding a moving image compression/decompression unit to the configuration of a wireless communication apparatus according to the seventh embodiment will be described. The moving image compression/decompression unit is connected with a bus described in the seventh embodiment. By configuring to include the image compression/decompression unit in the wireless communication apparatus, it becomes possible to readily transmit a compressed moving image, and decompress a received compressed moving image.

(Ninth Embodiment)

In the ninth embodiment, a configuration obtained by adding a clock generation unit to the configuration of a wireless communication apparatus of a first wireless system according to any one of the above-described embodiments will be described. The clock generation unit is connected with the wireless transceiver unit (see a wireless transceiver unit 60 of FIG. 8) of the wireless communication apparatus. A clock generated by the clock generation unit is externally output via an output terminal. In this way, by externally outputting a clock generated within the wireless communication apparatus, and operating the host side based on the externally output clock, it becomes possible to operate the host side and the wireless communication apparatus side in synchronism with each other.

(10th Embodiment)

In the 10th embodiment, a configuration obtained by adding a power source unit, a power source control unit, and a wireless power receiving unit to the configuration of a wireless communication apparatus of a first wireless system according to any one of the above-described embodiments will be described. The power source unit, power source control unit, and wireless power receiving unit are connected with the wireless transceiver unit of the wireless communication apparatus. As an example, FIG. 14 shows a configuration example obtained by adding the power source unit, power source control unit, and wireless power receiving unit to a wireless communication apparatus 100 of FIG. 8. In a wireless communication apparatus 1100 shown in FIG. 14, a power source unit 1101, a power source control unit 1102, and a wireless power receiving unit 1103 are respectively connected with a wireless transceiver unit 60. By configuring to include the power supply in the wireless communication apparatus, it becomes possible to perform a power consumption reducing operation while controlling the power supply.

(11th Embodiment)

In the 11th embodiment, a configuration obtained by adding a near-field communications (NFC) transceiver unit to the configuration of a wireless communication apparatus of the 10th embodiment will be described. The NFC transceiver unit is connected with the power source control unit and MAC processing unit of the wireless communication apparatus. For a wireless communication apparatus 1100 of FIG. 14, for example, the NFC transceiver unit is connected with a wireless communication apparatus 102 and a MAC processing unit 40 within a wireless transceiver unit 60 in FIG. 14. The NFC transceiver unit may reside within an upper layer processing unit 50, or may reside separately from the upper layer processing unit 50. By configuring to include the NFC transceiver unit in the wireless communication apparatus, it becomes possible to readily perform authentication processing, and to reduce the power consumption in a standby state by controlling the power supply using the NFC transceiver unit as a trigger.

(12th Embodiment)

In the 12th embodiment, a configuration obtained by adding a SIM card to the configuration of a wireless communication apparatus according to the 10th or 11th embodiment will be described. The SIM card is connected with a MAC processing unit 40. The SIM card may reside within an upper layer processing unit 50, or may reside separately from the upper layer processing unit 50. By configuring to include the SIM card in the wireless communication apparatus, it becomes possible to readily perform authentication processing.

(13th Embodiment)

In the 13th embodiment, a configuration obtained by adding an LED unit to the configuration of a wireless communication apparatus of a first wireless system according to any one of the above-described embodiments will be described. The LED unit is connected with the wireless transceiver unit (see a wireless transceiver unit 60 of FIG. 8) of the wireless communication apparatus. By configuring to include the LED in the wireless communication apparatus, it becomes possible to readily notify the user of the operation state of the wireless communication apparatus.

(14th Embodiment)

In the 14th embodiment, a configuration obtained by adding a vibrator unit to the configuration of a wireless communication apparatus of a first wireless system according to any one of the above-described embodiments will be described. The vibrator unit is connected with the wireless transceiver unit (see a wireless transceiver unit 60 of FIG. 8) of the wireless communication apparatus. By configuring to include the vibrator in the wireless communication apparatus, it becomes possible to readily notify the user of the operation state of the wireless communication apparatus.

(15th Embodiment)

In the 15th embodiment, a configuration obtained by adding an antenna 10 to the configuration of a wireless communication apparatus of a first wireless system according to any one of the above-described embodiments will be described. By configuring to include the antenna 10 in a wireless communication apparatus 1, it is possible to form a wireless communication apparatus as one apparatus including an antenna, thereby decreasing the implementation area. As shown in, for example, FIGS. 8 and 14, transmission processing and reception processing share the antenna 10. By sharing one antenna by transmission processing and reception processing, it is possible to downsize the wireless communication apparatus.

(16th Embodiment)

Figure 15:
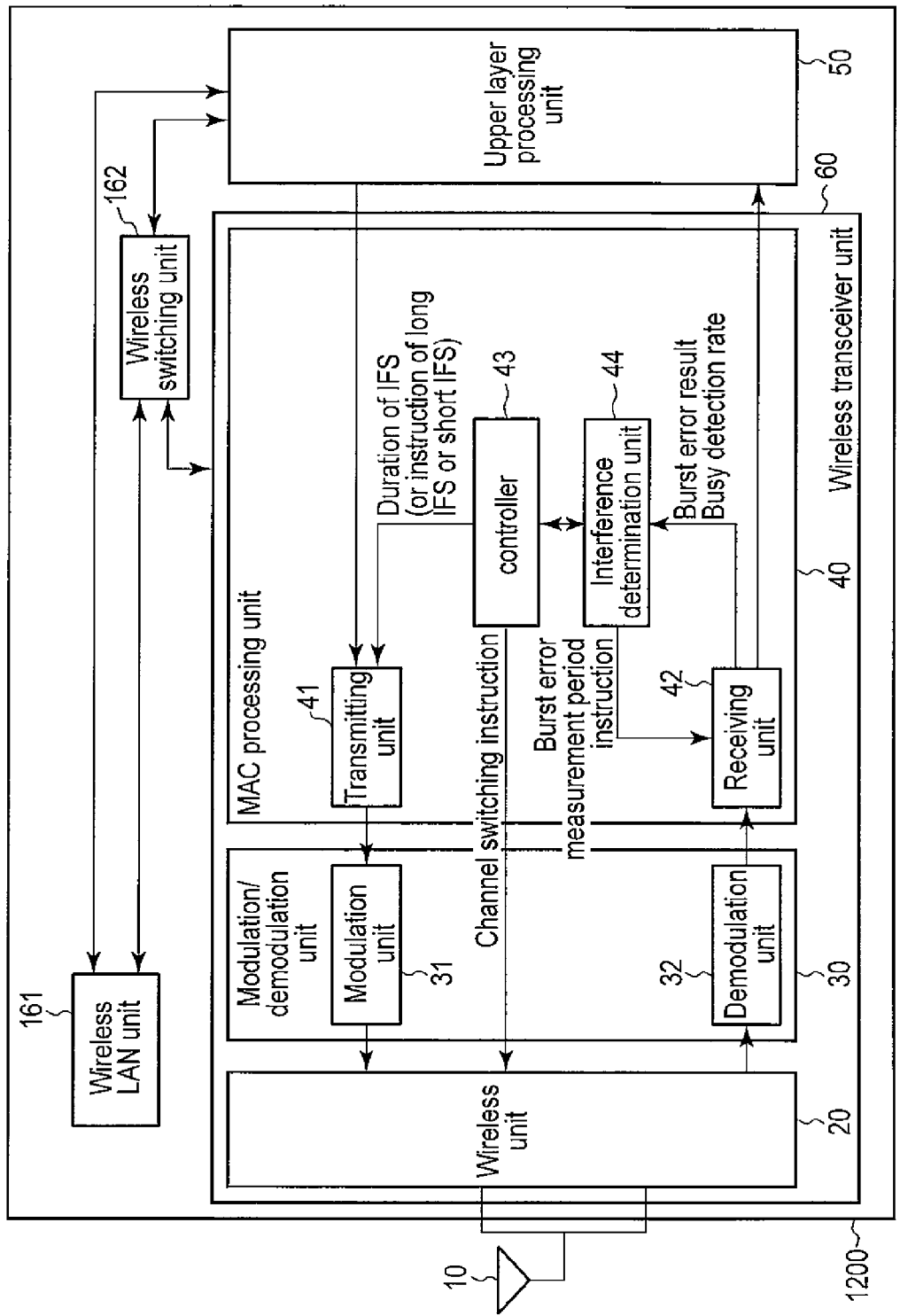
FIG. 15 is a block diagram showing a configuration example of a wireless communication apparatus in a first wireless system according to the 16th embodiment.

In the 16th embodiment, a configuration obtained by adding a wireless LAN unit and a wireless switching unit to the configuration of a wireless communication apparatus of a first wireless system according to any one of the above-described embodiments will be described. As an example, FIG. 15 shows a configuration example obtained by adding the wireless LAN unit and wireless switching unit to a wireless communication apparatus 100 of FIG. 8. In a wireless communication apparatus 1200 shown in FIG. 15, a wireless LAN unit 161 is connected with an upper layer processing unit 50 and a wireless switching unit 162, and the wireless switching unit 162 is connected with a wireless transceiver unit 60, the upper layer processing unit 50, and the wireless LAN unit 161. By configuring to include the wireless LAN function in the wireless communication apparatus, it becomes possible to switch between communications through a wireless LAN and a wireless transceiver unit 500 depending on a situation. Although it is possible to use a plurality of channels in a millimeter waveband as described above, it may be possible to switch to communication through a wireless LAN when, in the first wireless system, there is large interference with another wireless system on all the channels and therefore desired transmission/reception is impossible. The wireless LAN may be a wireless system (for example, an IEEE 802.11a, b, or g wireless system) which uses a frequency band different from that used by the first wireless system, or a wireless system (for example, an IEEE 802.11ad wireless system) which uses the same frequency band as that used by the first wireless system. Furthermore, the wireless LAN unit may have its own transmission/reception antenna. A wireless LAN which uses the same frequency band as that used by the first wireless system may share an antenna with the first wireless system.

(17th Embodiment)

In the 17th embodiment, a configuration obtained by adding a switch (SW) to the configuration of a wireless communication apparatus according to the 16th embodiment will be described. The switch is connected with a wireless transceiver unit, a wireless LAN unit, and a wireless switching unit. In a wireless communication apparatus 1200 of FIG. 15, the switch is connected with a wireless transceiver unit 60, wireless LAN unit 161, and wireless switching unit 162 of FIG. 15. By configuring to include the switch in the wireless communication apparatus, it becomes possible to switch between communications through a wireless LAN or the wireless transceiver unit depending on a situation while sharing an antenna.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus for use in a first wireless communication system, wherein the first wireless communication system may be interfered with by a second wireless communication system, a communication range of the second wireless communication system being wider than a communication range of the first wireless communication system, the wireless communication apparatus comprising:
   a controller, which is configured to:
      transmit, via an antenna, first frames, using a frequency channel selected from a plurality of frequency channels, and using a short interframe space or a long interframe space as compared with an interframe space of a specific type of frame used in the second wireless communication system;
      receive, via the antenna, second frames using the frequency channel;
      determine at least one of an error characteristic in the second frames and a busy status of the frequency channel; and
   select and execute, based on at least one of the error characteristic and the busy status, at least one control process from among a plurality of control processes including (i) a control process to change the frequency channel, (ii) a control process to change a duration of an interframe space, and (iii) a control process to change neither of the frequency channel and the duration.

2. The apparatus according to claim 1, wherein the controller determines the error characteristic, and selects to change the frequency channel when the error characteristic satisfies a criterion.

3. The apparatus according to claim 2, wherein the short interframe space is initially set as an interframe space to be used, and the controller temporally selects to change the interframe space to be used to the long interframe space when the error characteristic does not satisfy the criterion.

4. The apparatus according to claim 3, wherein the controller determines a busy status of the frequency channel with the short interframe space before changing the interframe space to be used to the long interframe space, and further determines, when the interframe space to be used is changed to the long interframe space, a busy status of the frequency channel with the long interframe space, and when there is no change between the busy status with the short interframe space and the busy status with the long interframe space, the controller selects to return the interframe space to be used to the short interframe space.

5. The apparatus according to claim 1, wherein:
the short interframe space is initially set as an interframe space to be used,
the controller determines the error characteristic and the busy status of the frequency channel with the short interframe space, and
the controller (i) selects, when the error characteristic satisfies a criterion, to change the frequency channel, (ii) selects, when the busy status does not satisfy a criterion, to keep the short interframe space set as the interframe space to be used, and (iii) selects, in other cases, to change the interframe space to be used to the long interframe space.

6. The apparatus according to claim 5, wherein the controller checks the busy status first, and then selects, when the busy status does not satisfy the criterion, to keep the short interframe space set as the interframe space to be used, and checks, when the busy status satisfies the criterion, the error characteristic.

7. The apparatus according to claim 1, wherein:
the long interframe space is initially set as an interframe space to be used,
the controller determines the error characteristic and the busy status of the frequency channel with the long interframe space, and
the controller (i) selects, when the error characteristic satisfies a criterion, to change the frequency channel, (ii) selects, when the busy status does not satisfy a criterion, to change the interframe space to be used to the short interframe space, and (iii) keeps, in other cases, the long interframe space set as the interframe space to be used.

8. The apparatus according to claim 7, wherein the controller determines the busy status first, and then selects, when the busy status does not satisfy the criterion, to change the interframe space to be used to the short interframe space, and checks, when the busy status satisfies the criterion, the error characteristic.

9. The apparatus according to claim 2, wherein the criterion for the error characteristic is that a reception error in the second frames continuously occurs for at least a predetermined number of frames.

10. The apparatus according to claim 1, wherein the controller has or is connectable to a function of managing a timer, and measures at least one of the error characteristic and the busy status for a given period until the timer times out.

11. The apparatus according to claim 10, wherein when the interframe space is changed to the short interframe space, a timer value of a timer to be started next is set longer than a previous timer value.

12. The apparatus according to claim 1, wherein when changing the frequency channel is selected, before changing the frequency channel, the controller finally determines whether to change the frequency channel in consideration of a channel characteristic for each frequency channel.

13. The apparatus according to claim 12, wherein the controller makes the final determination based on a relationship between a transmission rate on a current frequency channel and a time ratio during which the current frequency channel is clear, and a transmission rate on a changing destination frequency channel and a time ratio during which the changing destination frequency channel is clear.

14. The apparatus according to claim 13, wherein the controller recognizes, in advance, the time ratio during which the changing destination frequency channel is clear, or considers, as a specific value, the time ratio during which the changing destination frequency channel is clear.

15. The apparatus according to claim 1, wherein when changing the frequency channel is not selected and an error has occurred in transmission/reception of the first/second frames, the controller selects to transmit frames after performing fragment processing for decreasing a transmission data size.

16. The apparatus according to claim 1, wherein, based on a transmission ratio of connection request signals transmitted in connection processing, the controller selects whether to initially set the short interframe space or the long interframe space as an interframe space to be used first after the connection processing completes.

17. An interference avoidance method for a wireless communication apparatus for use in a first wireless communication system, wherein the first wireless communication system may be interfered with by a second wireless communication system, a communication range of the second wireless communication system being wider than a communication range of the first wireless communication system, the method comprising:
transmitting first frames, using a frequency channel selected from a plurality of frequency channels, and using a short interframe space or long interframe space as compared with an interframe space of a specific type of frame used in the second wireless communication system;
receiving second frames using the selected frequency channel;
determining at least one of an error characteristic in the second frames and a busy status of the frequency channel; and
performing control to select and execute, based on at least one of the error characteristic and the busy status, at least one control process from among a plurality of control processes including (i) a control process to change the frequency channel, (ii) a control process to change a duration of an interframe space, and (iii) a control process to change neither of the frequency channel and the duration.

* * * * *